United States Patent
Koga et al.

(10) Patent No.: US 9,133,794 B2
(45) Date of Patent: Sep. 15, 2015

(54) EGR GAS COOLING DEVICE FOR HYBRID VEHICLE AND EGR GAS COOLING METHOD FOR HYBRID VEHICLE

(71) Applicant: NISSAN MOTOR CO., LTD., Yokohama-shi, Kanagawa (JP)

(72) Inventors: Masaki Koga, Yokohama (JP); Yuko Mito, Ota-ku (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/399,035

(22) PCT Filed: Apr. 16, 2013

(86) PCT No.: PCT/JP2013/061323
§ 371 (c)(1),
(2) Date: Nov. 5, 2014

(87) PCT Pub. No.: WO2013/168520
PCT Pub. Date: Nov. 14, 2013

(65) Prior Publication Data
US 2015/0136094 A1     May 21, 2015

(30) Foreign Application Priority Data
May 9, 2012    (JP) ................................. 2012-108019

(51) Int. Cl.
*F02M 25/07*     (2006.01)
*F02D 41/00*     (2006.01)
*F02D 41/14*     (2006.01)

(52) U.S. Cl.
CPC ....... *F02M 25/0738* (2013.01); *F02D 41/0055* (2013.01); *F02D 41/0065* (2013.01); *F02M 25/0727* (2013.01); *F02M 25/0731* (2013.01); *F02D 2041/0067* (2013.01); *F02D 2041/1472* (2013.01); *Y02T 10/47* (2013.01)

(58) Field of Classification Search
CPC .......... F02M 25/0726; F02M 25/0727; F02M 25/0731
USPC ...................................... 123/568.12
See application file for complete search history.

(56) References Cited

U.S. PATENT DOCUMENTS

| | | | |
|---|---|---|---|
| 6,357,541 B1 * | 3/2002 | Matsuda et al. | 180/68.2 |
| 2004/0221577 A1 | 11/2004 | Yamaguchi et al. | |
| 2013/0298883 A1 * | 11/2013 | Archer et al. | 123/568.12 |
| 2014/0150758 A1 * | 6/2014 | Zurlo et al. | 123/568.12 |
| 2014/0288801 A1 * | 9/2014 | Sasaki | 701/102 |

FOREIGN PATENT DOCUMENTS

| | | |
|---|---|---|
| CN | 1277927 A | 12/2000 |
| JP | 2004-332596 A | 11/2004 |
| JP | 2006-207495 A | 8/2006 |
| JP | 2007-092718 A | 4/2007 |
| JP | 2010-090785 A | 4/2010 |
| JP | 2010-264876 A | 11/2010 |
| JP | 2011-098628 A | 5/2011 |

* cited by examiner

*Primary Examiner* — Erick Solis
(74) *Attorney, Agent, or Firm* — Foley & Lardner LLP (57) ABSTRACT

An EGR gas cooling device for hybrid vehicle provided in an EGR system for refluxing a part of exhaust gas of an engine as EGR gas to an intake passage and configured to cool the EGR gas in a hybrid vehicle including the engine and a motor as travel drive sources of the vehicle includes an EGR cooler for cooling the EGR gas using a refrigerant flowing in a strong electric cooling circuit for cooling the motor.

6 Claims, 6 Drawing Sheets

EGR GAS COOLING DEVICE FOR HYBRID VEHICLE AND EGR GAS COOLING METHOD FOR HYBRID VEHICLE

TECHNICAL FIELD

The prevent invention relates to a technology for cooling EGR gas in a hybrid vehicle.

BACKGROUND ART

JP2007-92718A discloses a technology for, in an EGR device including an EGR passage for recirculating a part of exhaust gas by allowing communication between an exhaust side and an intake side of an engine and an EGR cooler provided in this EGR passage, blocking an exit-side cooling water flow passage of the EGR cooler when engine cooling water is at a predetermined temperature or lower and allowing the communication of the exit-side cooling water passage when the temperature of the engine cooling water exceeds the predetermined temperature. In this way, the temperature of the cooling water is increased in a short time to suppress the production of condensed water in the EGR cooler when the engine cooling water is at a low temperature.

SUMMARY OF INVENTION

However, since the engine cooling water necessary to prevent dry-boil of the EGR cooler needs to be circulated in terms of compensating for a function of the EGR cooler, the EGR cooler cannot be sufficiently heated with the exhaust gas and the production of condensed water cannot be prevented if the temperature of the EGR gas is low or the amount of the EGR is small.

The present invention aims to accurately prevent the production of condensed water in an EGR cooler.

An EGR gas cooling device for hybrid vehicle according to one embodiment includes an EGR cooler for cooling EGR gas using a refrigerant flowing in a strong electric cooling circuit for cooling a motor which is one of travel drive sources of a vehicle.

Embodiments and advantages of the present invention are described in detail below along with the accompanying drawings.

DESCRIPTION OF EMBODIMENTS

-First Embodiment-

Figure 1:
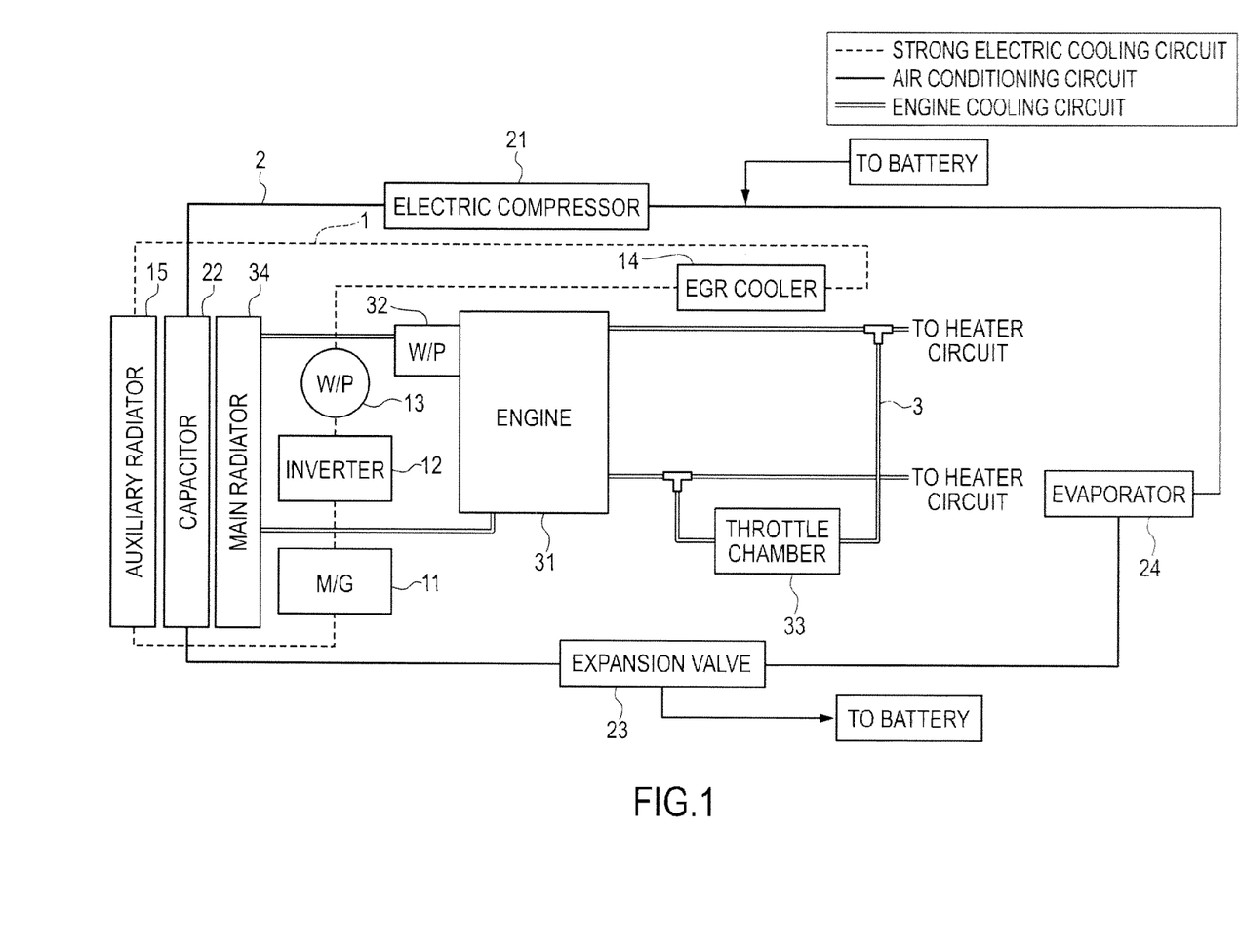
FIG. 1 is a system configuration diagram of a hybrid vehicle equipped with an EGR gas cooling device for hybrid vehicle according to a first embodiment.

FIG. 1 is a system configuration diagram of a hybrid vehicle equipped with an EGR gas cooling device for hybrid vehicle according to a first embodiment. This hybrid vehicle includes an engine 31 and a motor generator 11 as travel drive sources. A strong electric cooling circuit 1, an air conditioning circuit 2 and an engine cooling circuit 3 are shown in FIG. 1.

The strong electric cooling circuit 1 is a circuit (passage) in which cooling water for cooling the motor generator 11 and an inverter 12 flows, and the motor generator 11, the inverter 12, a water pump 13, an EGR cooler 14 and an auxiliary radiator 15 are provided.

The air conditioning circuit 2 is a circuit (passage) in which a refrigerant is circulated and an electric compressor 21, a capacitor 22, an expansion valve 23 and an evaporator 24 are provided.

The engine cooling circuit 3 is a circuit (passage) in which cooling water for cooling the engine 31 flows, and the engine 31, a water pump 32, a throttle chamber 33 and a main radiator 34 are provided. A capacity of the main radiator 34 is larger than that of the auxiliary radiator 15.

The cooling water in the strong electric cooling circuit 1 is circulated using the water pump 13. The cooling water discharged from the water pump 13 successively passes through the inverter 12, the motor generator 11, the auxiliary radiator 15 and the EGR cooler 14 and then returns to the water pump 13. The auxiliary radiator 15 radiates the heat of the cooling water by allowing the passage of the cooling water therethrough.

In the air conditioning circuit 2, the electric compressor 21 compresses a gaseous refrigerant. The capacitor 22 cools the high-pressure refrigerant discharged from the electric compressor 21. The expansion valve 23 decompresses the refrigerant discharged from the capacitor 22. The evaporator 24 cools air by evaporating the refrigerant decompressed by the expansion valve 23.

The cooling water in the engine cooling circuit 3 is circulated using the water pump 32. The cooling water discharged from the water pump 32 successively passes through the engine 31 and the main radiator 34 and then returns to the water pump 32. The main radiator 34 radiates the heat of the cooling water by allowing the passage of the cooling water therethrough.

Figure 2:
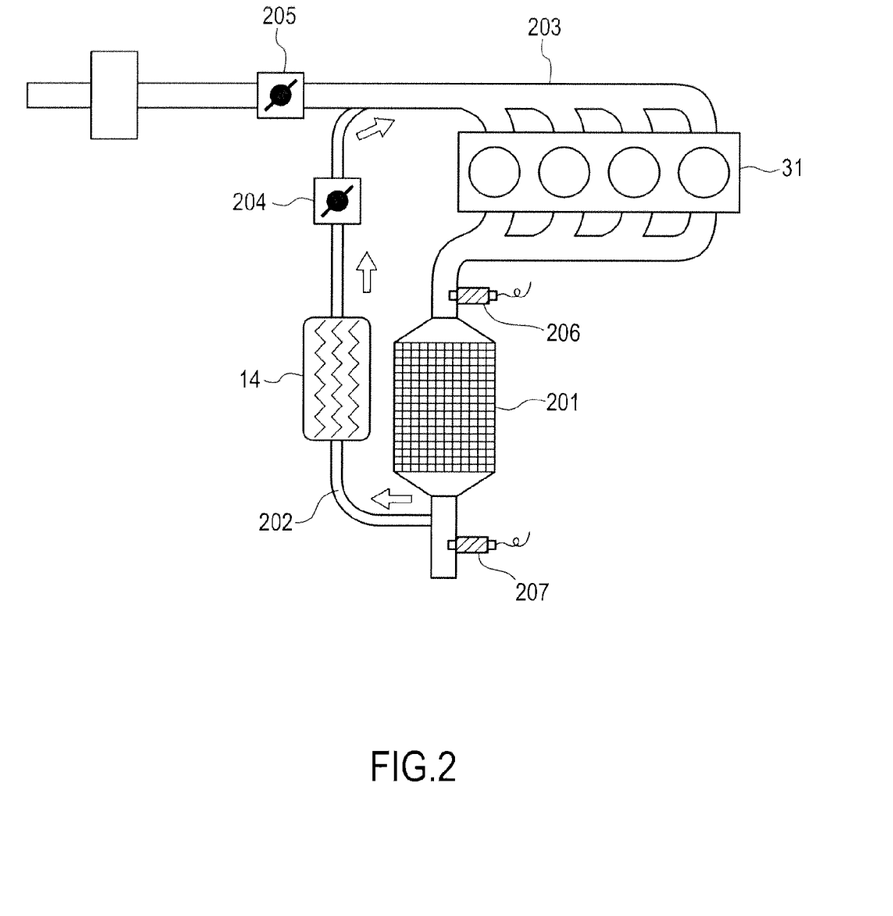
FIG. 2 is a diagram showing the configuration of an EGR system for refluxing a part (EGR gas) of exhaust gas to an intake system.

FIG. 2 is a diagram showing the configuration of an EGR (Exhaust Gas Recirculation) system for refluxing a part (EGR gas) of exhaust gas to an intake system. An exhaust purification catalyst 201 oxidizes HC (hydrocarbon) and CO (carbon monoxide) in the exhaust gas discharged from the engine 31 and reduces NOx (nitrogen oxides) to purify exhaust air. A part of the purified exhaust gas is refluxed as EGR gas to an intake passage 203 through an EGR passage 202. Specifically, air passing through a throttle valve 205 and the EGR gas refluxed through the EGR passage 202 flow into the engine 31.

The EGR cooler 14 for cooling the EGR gas and an EGR valve 204 for adjusting a flow rate of the EGR gas to be refluxed are provided in the EGR passage 202.

It should be noted that an A/F sensor 206 is provided upstream of the exhaust purification catalyst 201 of an exhaust system and an $O_2$ sensor 207 is provided downstream thereof.

As described using FIG. 1, the EGR cooler 14 is provided not in the engine cooling circuit 3, but in the strong electric cooling circuit 1. Specifically, instead of the cooling water flowing in the engine cooling circuit 3 (engine cooling water), the cooling water flowing in the strong electric cooling circuit 1 (strong electric cooling water) is used as the cooling water for cooling the EGR gas.

The cooling water in the strong electric cooling circuit 1 when the reflux of the EGR gas is started in the EGR system has a higher temperature than the cooling water in the engine cooling circuit 3. Accordingly, by using not the engine cooling water, but the already warmed strong electric cooling water to cool the EGR gas during engine warm-up, it is possible to prevent the production of condensed water and protect the EGR cooler 14. Further, since the EGR system can be used from an early stage during engine warm-up, fuel economy can be improved.

Since the EGR gas is cooled using the cooling water for cooling the motor generator 11 according to the EGR gas cooling device for hybrid vehicle in the first embodiment as described above, it is possible to prevent the production of condensed water and protect the EGR cooler 14 by using the already warmed strong electric cooling water during engine warm-up. Further, fuel economy can be improved since the EGR system can be used from an early stage during engine warm-up.

-Second Embodiment-

Figure 3:
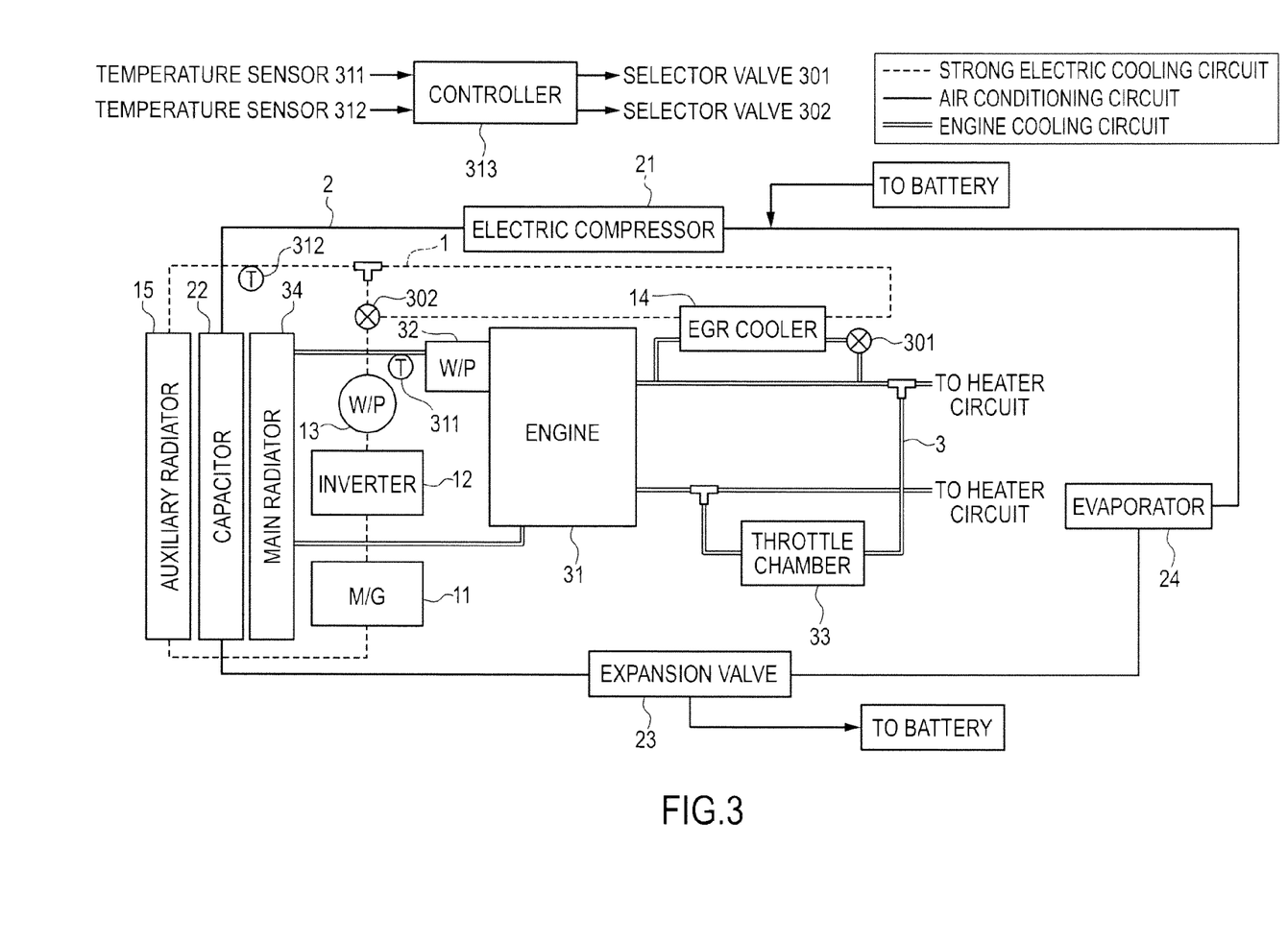
FIG. 3 is a system configuration diagram of a hybrid vehicle equipped with an EGR gas cooling device for hybrid vehicle according to a second embodiment.

FIG. 3 is a system configuration diagram of a hybrid vehicle equipped with an EGR gas cooling device for hybrid vehicle according to a second embodiment. In the present embodiment, a hybrid vehicle (e.g. plug-in hybrid vehicle) is assumed in which an engine 31 is started when an SOC of a battery pack (not shown) reaches a predetermined SOC after travel by a motor generator 11. In the following description, parts different from the system configuration diagram shown in FIG. 1 are described.

In the first embodiment, the EGR cooler 14 is provided in the strong electric cooling circuit 1. In the second embodiment, a configuration in which an EGR cooler 14 is provided in a strong electric cooling circuit 1 and a configuration in which it is provided in an engine cooling circuit 3 are switchable. Thus, the EGR cooler 14 includes selector valves 301, 302 for switching cooling water flowing in the strong electric cooling circuit 1 and that flowing in the engine cooling circuit 3 as cooling water for cooling EGR gas. When the selector valve 301 is opened and the selector valve 302 is closed, the cooling water in the engine cooling circuit 3 flows into the EGR cooler 14. When the selector valve 301 is closed and the selector valve 302 is opened, the cooling water in the strong electric cooling circuit 1 flows into the EGR cooler 14.

A first temperature sensor 311 detects the temperature of engine cooling water.

A second temperature sensor 312 detects the temperature of strong electric cooling water.

A controller 313 controls the opening and closing of the selector valves 301, 302 based on the engine cooling water temperature detected by the first temperature sensor 311 and the strong electric cooling water temperature detected by the second temperature sensor 312.

In the hybrid vehicle in which the engine 31 is first started after travel by the motor generator 11, EV travel by the motor generator 11 is sufficiently performed before an engine start request. Thus, the strong electric cooling water has a higher temperature than the engine cooling water. Thus, by using the strong electric cooling water as the cooling water for cooling the EGR gas after an engine start, it is possible to prevent the production of condensed water in the EGR gas cooling system and carry out EGR from an early stage during engine warm-up. Further, when the engine cooling water temperature becomes higher than the strong electric cooling water temperature, the engine cooling water is used as the cooling water for cooling the EGR gas.

Figure 4:
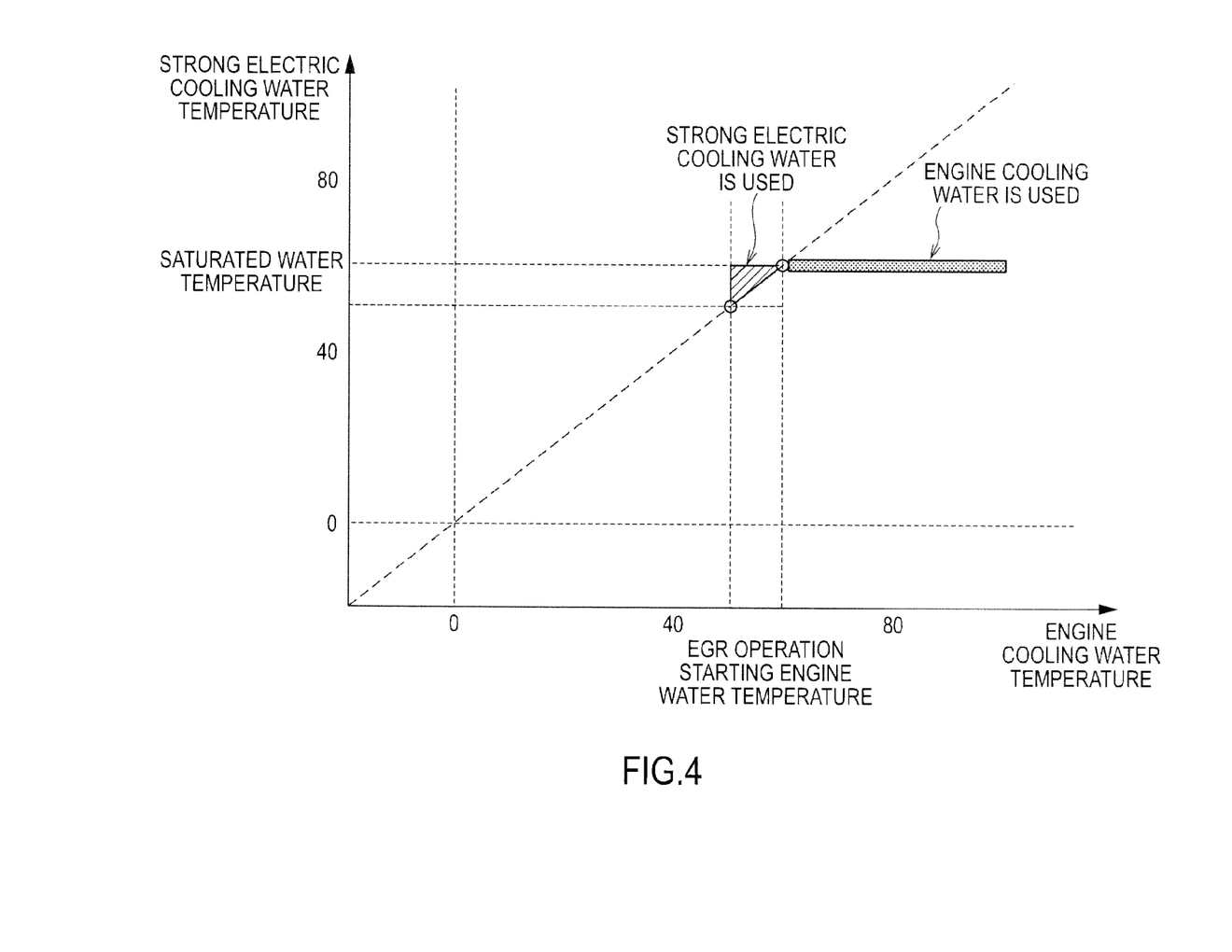
FIG. 4 is a graph showing a temperature region where strong electric cooling water is used as cooling water for cooling EGR gas and a temperature region where engine cooling water is used as such.

FIG. 4 is a graph showing a temperature region where the strong electric cooling water is used as the cooling water for cooling EGR gas and a temperature region where the engine cooling water is used as such. When the engine cooling water temperature becomes higher than an EGR operation starting engine water temperature, the reflux of the EGR gas to an intake passage is started. As described above, since the strong electric cooling water has a higher temperature than the engine cooling water immediately after the engine start, the strong electric cooling water is used as the cooling water for cooling the EGR gas (see FIG. 4).

In an example shown in FIG. 4, the strong electric cooling water is saturated at a predetermined saturated water temperature. When the engine cooling water temperature becomes higher than the saturated water temperature of the strong electric cooling water, i.e. higher than the strong electric cooling water temperature, the engine cooling water is used as the cooling water for cooling the EGR gas.

Figure 5:
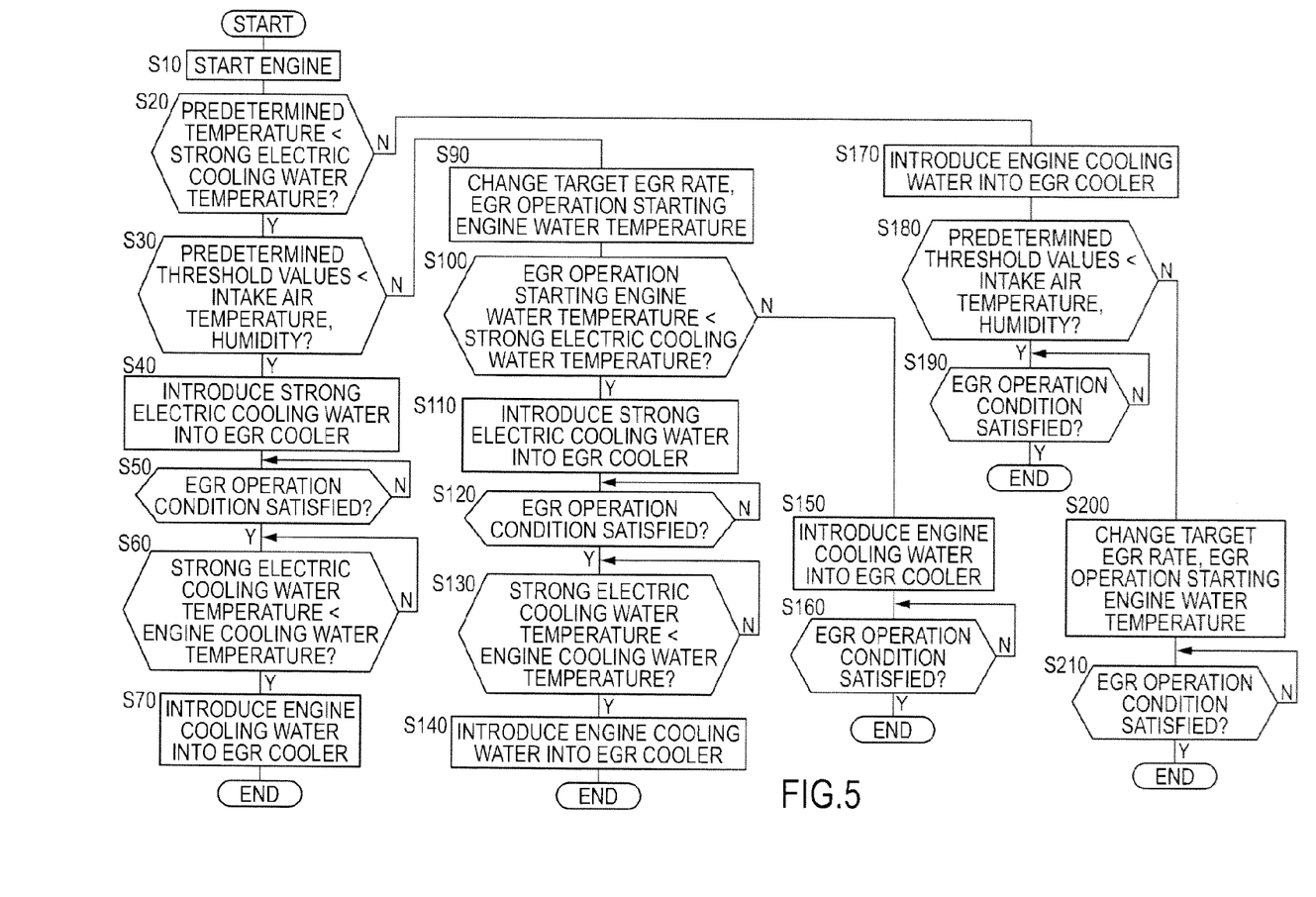
FIG. 5 is a flow chart showing a method for controlling the introduction of the cooling water into the EGR cooler.

FIG. 5 is a flow chart showing a method for controlling the introduction of the cooling water into the EGR cooler 14. A process started from Step S10 is performed by the controller 313.

In Step S10, the engine 31 is started. It should be noted that EV travel by the motor generator 11 is performed before the engine 31 is started.

In Step S20, it is determined whether or not the temperature of the strong electric cooling water detected by the second temperature sensor 312 is higher than a predetermined temperature. The process proceeds to Step S30 if the temperature of the strong electric cooling water is determined to be higher than the predetermined temperature while proceeding to Step S170 if it is determined to be not higher than the predetermined temperature.

In Step S30, it is determined whether or not an intake air temperature is higher than a predetermined threshold value T1 and a humidity is higher than a predetermined threshold value H1. Each of the intake air temperature and the humidity is one environment condition of the vehicle and detected by an unillustrated sensor and input to the controller 313.

Figure 6:
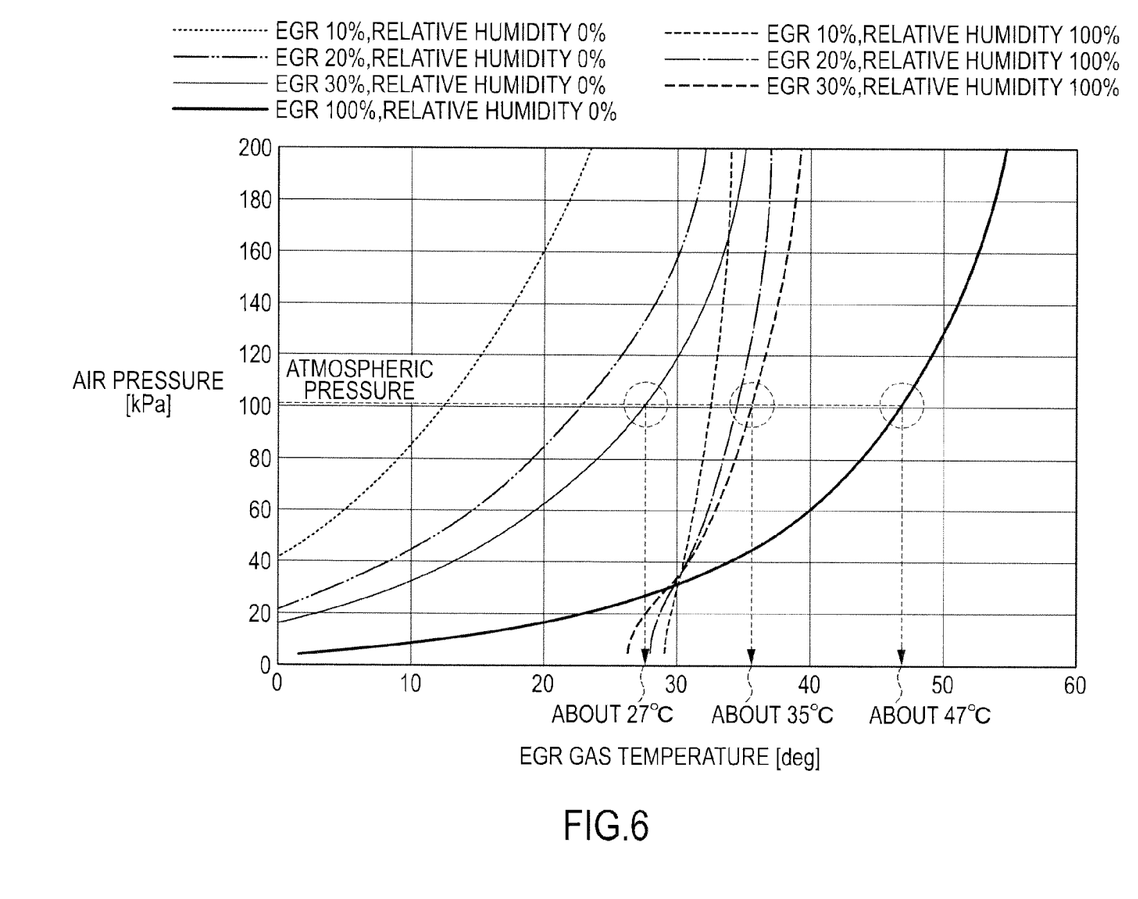
FIG. 6 is a graph showing a relationship of EGR gas temperature, air pressure and relative humidity, at which condensed water is produced, at each EGR rate which is a reflux rate of the EGR gas to an intake passage.

FIG. 6 is a graph showing a relationship of EGR gas temperature, air pressure and relative humidity, at which condensed water is produced, at each EGR rate which is a reflux rate of the EGR gas to the intake passage. For example, if the relative humidity is 0% and the EGR rate is 30% at an atmospheric pressure, condensed water is produced when the EGR gas temperature is 27° C. Further, if the relative humidity is 100% and the EGR rate is 30% at an atmospheric pressure, condensed water is produced when the EGR gas temperature is 35° C.

Condensed water is easily produced when the intake air temperature is low. Further, as shown in FIG. 6, when the EGR rate and the air pressure are the same, the EGR gas temperature at which condensed water is produced increases and condensed water is more easily produced with an increase in the relative humidity.

Accordingly, in Step S30, it is determined whether or not the intake air temperature is higher than the predetermined threshold value T1 and the humidity is higher than the predetermined threshold value H1. If the determination is negative, a condition under which condensed water is easily produced is determined and a control for preventing the production of condensed water is executed as described later. The process proceeds to Step S40 if the intake air temperature is determined to be higher than the predetermined threshold value T1 and the humidity is determined to be higher than the predetermined threshold value H1 while proceeding to Step S90 otherwise.

In Step S40, the cooling water in the strong electric cooling circuit 1 is caused to flow into the EGR cooler 14 by closing the selector valve 301 and opening the selector valve 302.

In Step S50, it is determined whether or not an EGR operation condition has been satisfied. The process waits in Step S50 if the EGR operation condition is determined not to have been satisfied, whereas the EGR valve 204 is opened and the process proceeds to Step S60 if the EGR operation condition is determined to have been satisfied.

In Step S60, it is determined whether or not the engine cooling water temperature detected by the first temperature sensor 311 is higher than the strong electric cooling water temperature detected by the second temperature sensor 312. The process waits in Step S60 if the engine cooling water temperature is determined to be not higher than the strong electric cooling water temperature while proceeding to Step S70 if the engine cooling water temperature is determined to be higher than the strong electric cooling water temperature.

In Step S70, the cooling water in the engine cooling circuit 3 is caused to flow into the EGR cooler 14 by opening the selector valve 301 and closing the selector valve 302.

In Step S90 reached after the determination of Step S30 is negative, a target EGR rate and the EGR operation starting engine water temperature are changed to prevent the production of condensed water. Specifically, the target EGR rate is reduced and the EGR operation starting engine water temperature is increased. It should be noted that, in Step S90, it may be possible only to reduce the target EGR rate or to increase the EGR operation starting engine water temperature.

In Step S100, it is determined whether or not the strong electric cooling water temperature detected by the second temperature sensor 312 is higher than the EGR operation starting engine water temperature changed in Step S90. The process proceeds to Step S110 if the strong electric cooling water temperature is determined to be higher than the EGR operation starting engine water temperature.

In Step S110, the cooling water in the strong electric cooling circuit 1 is caused to flow into the EGR cooler 14 by closing the selector valve 301 and opening the selector valve 302.

In Step S120, it is determined whether or not the EGR operation condition has been satisfied. The process waits in Step S120 if the EGR operation condition is determined not to have been satisfied, whereas the EGR valve 204 is opened and the process proceeds to Step S130 if it is determined to have been satisfied.

In Step S130, it is determined whether or not the engine cooling water temperature detected by the first temperature sensor 311 is higher than the strong electric cooling water temperature detected by the second temperature sensor 312. The process waits in Step S130 if the engine cooling water temperature is determined to be not higher than the strong electric cooling water temperature while proceeding to Step S140 if the engine cooling water temperature is determined to be higher than the strong electric cooling water temperature.

In Step S140, the cooling water in the engine cooling circuit 3 is caused to flow into the EGR cooler 14 by opening the selector valve 301 and closing the selector valve 302.

If the strong electric cooling water temperature is determined to be not higher than the EGR operation starting engine water temperature in Step S100, the process proceeds to Step S150. In Step S150, the cooling water in the engine cooling circuit 3 is caused to flow into the EGR cooler 14 by opening the selector valve 301 and closing the selector valve 302.

In Step S160, it is determined whether or not the EGR operation condition has been satisfied. The process waits in Step S160 if the EGR operation condition is determined not to have been satisfied, whereas the EGR valve 204 is opened and the process of the flow chart is finished if the EGR operation condition is determined to have been satisfied.

In Step S170 reached after the determination of Step S20 is negative, the cooling water in the engine cooling circuit 3 is caused to flow into the EGR cooler 14 by opening the selector valve 301 and closing the selector valve 302.

In Step S180, it is determined whether or not the intake air temperature is higher than the predetermined threshold value T1 and the humidity is higher than the predetermined threshold value H1. The process proceeds to Step S190 if the intake air temperature is determined to be higher than the predetermined threshold value T1 and the humidity is determined to be higher than the predetermined threshold value H1 while proceeding to Step S200 otherwise.

In Step S190, it is determined whether or not the EGR operation condition has been satisfied. The process waits in Step S190 if the EGR operation condition is determined not to have been satisfied, whereas the EGR valve 204 is opened and the process of the flow chart is finished if the EGR operation condition is determined to have been satisfied.

On the other hand, in Step S200, the target EGR rate and the EGR operation starting engine water temperature are changed to prevent the production of condensed water. Specifically, the target EGR rate is reduced and the EGR operation starting engine water temperature is increased. It should be noted that, in Step S200, it may be possible only to reduce the target EGR rate or to increase the EGR operation starting engine water temperature.

In Step S210, it is determined whether or not the EGR operation condition has been satisfied. The process waits in Step S210 if the EGR operation condition is determined not to have been satisfied, whereas the EGR valve 204 is opened and the process of the flow chart is finished if it is determined to have been satisfied.

As described above, according to the EGR gas cooling device for hybrid vehicle in the second embodiment, the selector valves 301, 302 are provided which can switch the cooling water flowing in the engine cooling circuit 3 and that flowing in the strong electric cooling circuit 1 as the cooling water for cooling the EGR gas, and the opening and closing of the selector valves 301, 302 are controlled according to the temperature of the cooling water flowing in the engine cooling circuit 3. In this way, a switch can be made to the proper one of the cooling water flowing in the engine cooling circuit 3 and that flowing in the strong electric cooling circuit 1 to use it as the cooling water for cooling the EGR gas according to the engine cooling water temperature.

Particularly in the hybrid vehicle in which the engine is started after travel by the motor, the opening and closing of the selector valves 301, 302 are so controlled that the cooling water flowing in the strong electric cooling circuit 1 is selected as the cooling water for cooling the EGR gas after the start of the engine 31 and the cooling water flowing in the engine cooling circuit 3 is selected as the cooling water for cooling the EGR gas when the temperature of the engine cooling water becomes higher than the predetermined temperature. It is possible to prevent the production of condensed water and perform the EGR from an early stage during engine warm-up by using the already warmed strong electric cooling water as the cooling water for cooling the EGR gas after the start of the engine 31. Thus, fuel economy can be improved.

Further, if the strong electric cooling water remains to be used as the cooling water for cooling the EGR gas, the capacity of an auxiliary radiator 15 provided in the strong electric cooling circuit 1 needs to be increased to a capacity comparable to that of a main radiator 34. However, since the cooling water for cooling the EGR gas is switched from the strong electric cooling water to the engine cooling water when the temperature of the engine cooling water becomes higher than the predetermined temperature, the capacity of the auxiliary radiator 15 needs not be increased and a cost increase can be suppressed.

Further, since the reflux of the EGR gas is started when the temperature of the refrigerant flowing in the engine cooling circuit exceeds an EGR starting temperature and the EGR starting temperature is changed based on the environment conditions of the vehicle in the EGR system, the production of condensed water can be prevented by increasing the EGR starting temperature under an environment condition that condensed water is easily produced. Further, under the environment condition that condensed water is easily produced, the production of condensed water can be prevented by reducing a reflux rate of the EGR gas.

The present invention is not limited to the aforementioned embodiments. For example, although an example in which water is used as the refrigerant flowing in the strong electric cooling circuit 1 has been described, there is no limitation to water. Similarly, the refrigerant flowing in the engine cooling circuit 3 is also not limited to water.

The present application claims a priority of Japanese Patent Application No. 2012-108019 filed with the Japan Patent Office on May 9, 2012, all the contents of which are hereby incorporated by reference.

The invention claimed is:

1. An EGR gas cooling device for hybrid vehicle provided in an EGR system for refluxing a part of exhaust gas of an engine as EGR gas to an intake passage and configured to cool the EGR gas in a hybrid vehicle including the engine and a motor as travel drive sources of the vehicle, comprising:
    an EGR cooler configured to cool the EGR gas of the vehicle using a refrigerant;
    a switching unit capable of switching a mode for cooling the EGR gas only by a refrigerant flowing in an engine cooling circuit for cooling the engine and a mode for cooling the EGR gas only by a refrigerant flowing in a strong electric cooling circuit for cooling the motor;
    an engine cooling refrigerant temperature detecting unit configured to detect the temperature of the refrigerant flowing in the engine cooling circuit; and
    a switch control unit configured to control a switch by the switching unit according to the temperature of the refrigerant flowing in the engine cooling circuit.

2. The EGR gas cooling device for hybrid vehicle according to claim 1, wherein:
    in the hybrid vehicle in which the engine is started after travel by the motor,
    the switch control unit is configured to control the switch by the switching unit to select the refrigerant flowing in the strong electric cooling circuit as the refrigerant for cooling the EGR gas after the start of the engine and select the refrigerant flowing in the engine cooling circuit as the refrigerant for cooling the EGR gas when the temperature of the refrigerant flowing in the engine cooling circuit becomes higher than a predetermined temperature.

3. The EGR gas cooling device for hybrid vehicle according to claim 2, further comprising:
    a strong electric cooling refrigerant temperature detecting unit configured to detect the temperature of the refrigerant flowing in the strong electric cooling circuit,
    wherein the predetermined temperature is the temperature of the refrigerant flowing in the strong electric cooling circuit.

4. The EGR gas cooling device for hybrid vehicle according to claim 1, wherein:
    the reflux of the EGR gas is started in the EGR system when the temperature of the refrigerant flowing in the engine cooling circuit exceeds an EGR starting temperature; and
    the EGR gas cooling device further comprises:
    an environment condition detecting unit configured to detect an environment condition of the vehicle; and
    an EGR starting temperature changing unit configured to change the EGR starting temperature based on the environment condition of the vehicle.

5. The EGR gas cooling device for hybrid vehicle according to claim 1, further comprising:
    an environment condition detecting unit configured to detect an environment condition of the vehicle; and
    an EGR rate changing unit configured to change a reflux rate of the EGR gas based on the environment condition of the vehicle.

6. An EGR gas cooling method for an EGR system of a hybrid vehicle for refluxing a part of exhaust gas of an engine as EGR gas to an intake passage and configured to cool the EGR gas in a hybrid vehicle including the engine and a motor as travel drive sources of the vehicle, comprising:
    detecting the temperature of a refrigerant flowing in an engine cooling circuit; and
    switching a mode for cooling the EGR gas only by a refrigerant flowing in the engine cooling circuit for cooling the engine and a mode for cooling the EGR gas only by a refrigerant flowing in a strong electric cooling circuit for cooling the motor according to the temperature of the refrigerant flowing in the engine cooling circuit.

* * * * *